(12) United States Patent
Fisher

(10) Patent No.: US 11,352,552 B1
(45) Date of Patent: Jun. 7, 2022

(54) PROPORTIONING OF AN ADDITIVE IN TREATMENT FLUIDS FOR DELIVERY INTO A SUBTERRANEAN FORMATION

(71) Applicant: Halliburton Energy Services, Inc., Houston, TX (US)

(72) Inventor: Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/171,518

(22) Filed: Feb. 9, 2021

(51) Int. Cl.
| *E21B 43/267* | (2006.01) |
| *C09K 8/80* | (2006.01) |
| *C09K 8/88* | (2006.01) |
| *E21B 43/26* | (2006.01) |

(52) U.S. Cl.
CPC ................ *C09K 8/80* (2013.01); *C09K 8/882* (2013.01); *E21B 43/267* (2013.01); *E21B 43/2607* (2020.05); *C09K 2208/28* (2013.01)

(58) Field of Classification Search
None
See application file for complete search history.

(56) References Cited

U.S. PATENT DOCUMENTS

| 4,886,367 | A | * | 12/1989 | Bragg | ..................... | B01F 3/088 |
| | | | | | | 366/132 |
| 5,883,053 | A | * | 3/1999 | Tudor | ..................... | C09K 8/80 |
| | | | | | | 507/102 |
| 7,621,328 | B1 | | 11/2009 | Case | | |
| 7,621,329 | B1 | | 11/2009 | Case | | |
| 7,730,948 | B2 | | 6/2010 | De | | |
| 7,845,413 | B2 | | 12/2010 | Shampine | | |
| 10,752,832 | B2 | | 8/2020 | Nguyen | | |
| 2009/0277640 | A1 | * | 11/2009 | Thompson | ............... | C09K 8/68 |
| | | | | | | 166/305.1 |
| 2012/0031618 | A1 | * | 2/2012 | Armstrong | ............. | C09K 8/685 |
| | | | | | | 166/305.1 |
| 2014/0166267 | A1 | * | 6/2014 | Weightman | ............. | E21B 47/06 |
| | | | | | | 166/250.01 |
| 2017/0313930 | A1 | * | 11/2017 | Patel | ........................ | C09K 8/80 |
| 2019/0100692 | A1 | * | 4/2019 | Deysarkar | ............. | C09K 8/725 |
| 2019/0277129 | A1 | * | 9/2019 | Warren | ................... | E21B 47/00 |

* cited by examiner

*Primary Examiner* — Andrew Sue-Ako
(74) *Attorney, Agent, or Firm* — K&L Gates LLP (57) ABSTRACT

A method of delivering a treatment fluid into a subterranean formation and system therefor are provided herein. The treatment fluid is delivered using a pumping assembly, which comprises a clean side and a slurry side. The method includes determining a downhole rate of the additive in the treatment fluid, injecting the additive into the slurry side at a first slurry side location, injecting the additive into at least one of the slurry side at a second slurry side location or the clean side, combining the additive from the first slurry side location with any additive from the second slurry side location or the clean side to form the treatment fluid with the downhole rate of the additive, and delivering the treatment fluid into the subterranean formation.

21 Claims, 3 Drawing Sheets

PROPORTIONING OF AN ADDITIVE IN TREATMENT FLUIDS FOR DELIVERY INTO A SUBTERRANEAN FORMATION

BACKGROUND

This section is intended to provide relevant background information to facilitate a better understanding of the various aspects of the described embodiments. Accordingly, these statements are to be read in this light and not as admissions of prior art.

It is often desirable to treat a wellbore or a subterranean formation with various types of treatment fluids in the efforts to produce oil or gas from a reservoir. A treatment is designed to resolve a specific wellbore or reservoir condition. For example, stimulation is a treatment performed on a well to restore or enhance the productivity of the well. Stimulation treatments include, for example, hydraulic fracturing and matrix treatments. Fracturing treatments are performed above the fracture pressure of the reservoir formation and create a highly conductive flow path between the reservoir and the wellbore. Hydraulic fracturing will hereinafter be described in more detail. Matrix treatments are performed below the reservoir fracture pressure and generally are designed to restore the natural permeability of the reservoir following damage to the near-wellbore region.

Friction-reducing agents and other additives are known to reduce friction in treatment fluids in a subterranean formation, as well as provide erosion reduction benefits to pumping equipment at the surface. Generally, increasing the amount of additives in the fluid provides enhanced benefits, particularly for erosion reduction of the pumping equipment. However, material costs and detrimental effects from excessive additive discourage the overuse of such additives. A need therefore exists for a method of proportioning an additive among pumping equipment to maximize erosion reduction and other benefits while minimizing detrimental effects.

BRIEF DESCRIPTION OF THE DRAWINGS

Embodiments for proportioning of an additive in fluids for delivery into a subterranean formation are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

In this description, the "rate," such as in the "rate of additive," "first slurry side rate," "second slurry side rate," "clean rate," or "downhole rate," is the mass flow rate of an additive in a treatment fluid at a particular location, expressed in units of lbs additive/min. In particular, the "downhole rate" is the mass flow rate of additive in the treatment fluid flowing downhole in a borehole. The downhole rate of additive in the treatment fluid is determined by the downhole concentration of the additive and downhole flowrate of the treatment fluid. Furthermore, the injection rates of additive injected throughout the pumping assembly sum to the downhole rate.

In this description, the "downhole concentration" or "downhole additive concentration" is the concentration of additive in the treatment fluid flowing downhole in a borehole, expressed in units of lbs additive/gal treatment fluid. The downhole concentration may be selected based on the purpose of the additive. For example, the downhole concentration of the additive in the treatment fluid may be a concentration suitable to reduce friction and promote laminar flow of the treatment fluid in the subterranean formation.

In this description, the "flowrate," such as in the "flowrate of treatment fluid," "minimum flowrate," or "downhole flowrate," is the volumetric flow rate of the treatment fluid at a particular location, expressed in units of gal treatment fluid/min or gpm. In particular, the "downhole flowrate" is the flowrate of treatment fluid flowing downhole in a borehole. The downhole flowrate may vary widely among applications.

The present disclosure describes a method of and system for delivering a treatment fluid to a subterranean formation using a pumping assembly and proportioning an additive in the treatment fluid via injection sites throughout the pumping assembly. The treatment fluid includes a base fluid, a proppant, and an additive, such as a friction-reducing agent. The pumping assembly includes a clean side and a slurry side.

The method includes determining a downhole rate of the additive in the treatment fluid. In any embodiment, the various injection rates of additive injected into the pumping assembly at different locations sum to the downhole rate. The method further includes injecting the additive into the slurry side at a first slurry side location in or upstream of a slurry mixer at a first slurry side rate. The method further includes injecting the additive into at least one of (1) the slurry side at a second slurry side location downstream of the slurry mixer and upstream of a discharge pump at a second slurry side rate or (2) the clean side at a clean side rate, where the combination of the second slurry side rate and the clean side rate amounts to the difference between the downhole rate and the first slurry side rate. The additive can be injected at the second slurry side location, the clean side, or both, as well as other locations and combinations thereof. The method further includes combining the additive from the first slurry side location with the additive from either the second slurry side location or the clean side to form the treatment fluid with the downhole rate of the additive. That is, the combining can be performed on the additive from the first slurry side location with the additive from the second slurry side location, the additive from the first slurry side location with the additive from the clean side, the additive from the first slurry side location with the additive from the second slurry side location and the additive from the clean side, or the combining can be performed on the additive injected at other locations and in combinations thereof. The method further includes delivering the treatment fluid into the subterranean formation.

The various rates of additive are suitable to achieve a positive benefit or avoid a negative detriment. For example, the additive rates in the slurry side can be suitable to reduce erosion in the slurry side by at least 35%. The downhole rate is suitable to reduce friction and promote laminar flow of the treatment fluid in the subterranean formation. The first slurry side rate can be suitable to prevent aeration of the base fluid by air entrained in the proppant in order to maintain a minimum operating pressure of a discharge pump downstream of the first slurry side location. The second slurry side rate can be suitable to maintain a minimum flowrate of the base fluid through a suction pump upstream of the second slurry side location to prevent exceeding a proppant transport capability of the base fluid.

Figure 1:
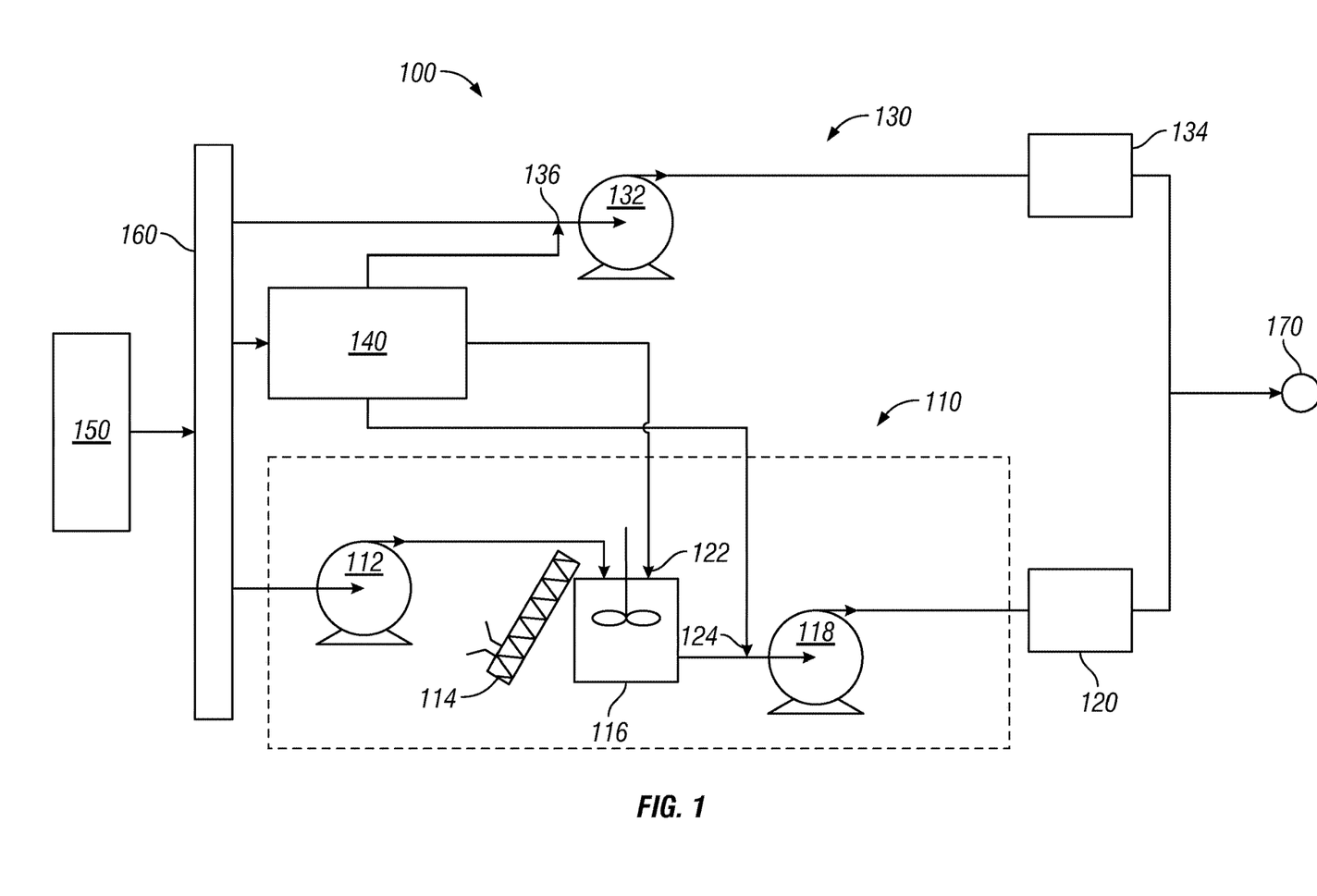
FIG. 1 is a diagram of a system comprising a slurry side and a clean side, according to one or more embodiments.

Turning now to the figures, FIG. 1 is a diagram of a pumping assembly 100 comprising a slurry side 110 and a clean side 130. The slurry side 110 comprises a suction pump 112, proppant screws 114, a slurry mixer 116, a discharge pump 118, a slurry frac pump 120, a first slurry injection point 122 (also referred to herein as a first slurry side location 122), and a second slurry injection point 124 (also referred to herein as a second slurry side location 124). The clean side 130 comprises a clean boost 132, a clean frac pump 134, and a clean injection point 136. The pumping assembly 100 further comprises an additive blender 140 for injecting an additive into the slurry side 110 and/or the clean side 130. The pumping assembly 100 further comprises a tank 150 and a separator 160 to provide the base fluid to the slurry side 110, the clean side 130, and the additive blender 140. FIG. 1 also shows a wellhead 170 to which the treatment fluid is delivered.

The treatment fluid comprising a base fluid is provided to the pumping assembly 100 in a tank 150. The treatment fluid flows from the tank 150 to a separator 160, which separates the treatment fluid into three streams. In a first stream, the separator 160 provides the treatment fluid to the slurry side 110 via the suction pump 112. In a second stream, the separator 160 provides the treatment fluid to the additive blender 140. In a third stream, the separator 160 provides the treatment fluid to the clean side 130 via the clean boost 132.

The treatment fluid enters the slurry side 110 through the suction pump 112. The suction pump 112 pumps the treatment fluid at a suitable operating pressure. For example, the operating pressure may be between about 5 and about 50 psi, between about 10 and about 50 psi, or between about 10 and about 40 psi. A minimum flowrate of the treatment fluid or base fluid is maintained through the suction pump 112. The minimum flowrate of the treatment fluid or base fluid through the suction pump 112 can be, for example, between about 200 and about 5,000 gal/min, between about 300 and about 5,000 gal/min, between about 400 and about 5,000 gal/min, or can be about 200 gal/min, about 300 gal/min, about 400 gal/min, about 500 gal/min, about 600 gal/min, about 700 gal/min, about 800 gal/min, about 900 gal/min, or about 1,000 gal/min. The treatment fluid comprising the base fluid is pumped to a slurry mixer 116. The slurry mixer 116 can be a mixing tub 116, which is open to atmosphere, or a centrifugal slurry mixer 116. Where the slurry mixer 116 is a centrifugal slurry mixer 116, the suction pump 112 can be a centrifugal suction pump 112 and the discharge pump 118 can be a centrifugal discharge pump 118. A proppant is fed into the slurry mixer 116 from proppant screws 114 to be mixed with the base fluid. The proppant can be fed at a rate, for example, between about 5 and about 300 ft³/min, between about 10 and about 250 ft³/min, or between about 10 and about 200 ft³/min. Additionally, an additive injected from the additive blender 140 at the first slurry injection point 122 enters the slurry mixer 116 and is mixed with the base fluid and proppant. The first slurry injection point 122 can be located in the slurry mixer 116 as shown in FIG. 1 or upstream of the slurry mixer 116 (i.e. to the left of the slurry mixer 116 in FIG. 1).

The rate of additive injected at the first slurry injection point 122 is suitable to maintain a minimum operating pressure of the discharge pump 118, which is downstream of the slurry mixer 116 as shown in FIG. 1. The minimum operating pressure of the discharge pump 118 may be, for example, between about 10 and about 250 psi, between about 25 and about 200 psi, between about 50 and about 150 psi, or about 50 psi, about 60 psi, about 70 psi, about 80 psi, about 90 psi, about 100 psi, about 110 psi, about 120 psi, about 130 psi, about 140 psi, or about 150 psi. Where the additive comprises a friction-reducing agent, erosion reduction benefits to the pumping assembly 100 are maximized by maximizing the rate of additive injected at the first slurry injection point 122. Erosion and degradation of the slurry frac pump 120 can be avoided by maintaining the operating pressure of the discharge pump 118 at or above a minimum value. The slurry frac pump 120 includes one or more positive displacement pumps 120, which are sensitive to net positive suction head. If the operating pressure of the discharge pump 118 drops too low, the slurry frac pump 120 can cavitate, causing significant damage to the slurry frac pump 120. Aeration of the base fluid in the slurry mixer 116 is believed to cause a drop in operating pressure of the discharge pump 118, resulting in cavitation of the slurry frac pump 120. Air entrained in the proppant can cause aeration of the base fluid in the slurry mixer 116 if excessive amounts of additive are injected at or upstream of the first slurry injection point 122. Thus, degradation of the slurry frac pump 120 is avoided by restricting the rate of additive injected at the first slurry injection point 122 to a maximum value.

In general, liquid friction-reducing agents cause lesser drops in operating pressure of the discharge pump due to aeration than solid friction-reducing agents. Accordingly, higher rates of liquid friction-reducing agents can be injected before the operating pressure of the discharge pump falls below an acceptable minimum value. In an embodiment wherein the additive comprises a liquid friction-reducing agent, the rate of additive injected at the first slurry injection point 122 can be greater than in an embodiment wherein the additive comprises a solid friction-reducing agent. In an embodiment wherein the additive comprises a liquid-friction reducing agent, the rate of additive injected at the first slurry injection point 122 can be approximately equal to the downhole rate.

The treatment fluid comprising the base fluid, proppant, and additive flow from the slurry mixer 116 to the discharge pump 118. Additive can be injected at a second slurry injection point 124, which is upstream of the discharge pump 118 and downstream of the slurry mixer 116 as shown in FIG. 1. The rate of additive injected at the second slurry injection point 124 is suitable to prevent exceeding a proppant transport capability of the base fluid in the slurry mixer 116. Where the additive comprises a friction-reducing agent, erosion reduction benefits to the pumping assembly 100 are maximized by first maximizing the rate of additive injected at the first slurry injection point 122. Then the additive is injected at the second slurry injection point 124 or the clean injection point 136. In embodiments wherein the additive comprises a dry polyacrylamide, erosion reduction benefits are maximized by first maximizing the rate of additive injected at the first slurry injection point 122, then maximizing the rate of additive injected at the second slurry injection point 124, and then injecting a remainder rate of additive at the clean injection point 136 such that the sum of all the injected additive rates is the downhole rate. Where other additives, treatment fluids, and applications are envisioned, after maximizing the rate of additive injected at the first slurry injection point 122, the additive can be proportioned throughout the rest of the pumping assembly 100 as determined by applicable constraints.

Injecting too much additive at the second slurry injection point 124 can cause excess proppant in the slurry mixer 116. To inject the additive at the second slurry injection point 124, base fluid must be diverted to the additive blender 140 to carry the additive. Since the downhole flowrate of treatment fluid into the wellhead 170 is predetermined, an increase in the flowrate of base fluid to the additive blender 140 is accompanied by a decrease in the flowrate of base fluid to the suction pump 112. If the flowrate of base fluid to the suction pump 112 decreases significantly, the amount of proppant in the slurry mixer 116 can exceed a proppant transport capability of the base fluid, resulting in proppant falling out of the base fluid and setting. The proppant transport capability of the base fluid can be between about 10 and about 35 lbs proppant/gal base fluid, between about 14 and about 24 lbs proppant/gal base fluid, or can be about 24 lbs proppant/gal base fluid.

The amount of proppant in the base fluid in the slurry mixer 116 can be characterized by the flowrate of the base fluid through the suction pump 112. Thus the rate of additive injected at the second slurry injection point 124 is suitable to maintain a minimum flowrate of the base fluid through the suction pump 112 as described above, which prevents exceeding the proppant transport capability of the base fluid. The suction pump 112 is upstream of the slurry mixer 116 as shown in FIG. 1. The rate of the additive injected at the second slurry injection point 124 may be significantly lower than the rate of the additive injected at the first slurry injection point 122 in an embodiment where the additive is a liquid friction-reducing agent, or may be zero in such an embodiment.

The treatment fluid comprising the base fluid enters the clean side 130 through the clean boost 132. The base fluid in the clean side 130 is substantially free of proppant. The clean boost 132 may pump the base fluid at an operating pressure, for example, between about 10 and about 250 psi, between about 25 and about 200 psi, or between about 50 and about 150 psi, and the base fluid flows through the clean side 130 at a flowrate, for example, between about 200 and about 5,000 gal/min, between about 300 and about 5,000 gal/min, between about 400 and about 5,000 gal/min, or can be about 200 gal/min, about 300 gal/min, about 400 gal/min, about 500 gal/min, about 600 gal/min, about 700 gal/min, about 800 gal/min, about 900 gal/min, or about 1,000 gal/min. The additive is injected into the proppant-free treatment fluid comprising the base fluid at the clean injection point 136.

In embodiments where the additive comprises a dry polyacrylamide, the rate of the additive injected at the clean injection point 136 is a remainder rate. That is, it is the amount required such that the rates of additive injected throughout the pumping assembly 100 sum to the downhole rate after the one or more rates of additive have been injected into the slurry side 110. In embodiments where the additive comprises a dry polyacrylamide, erosion reduction benefits to the pumping assembly 100 are maximized by first maximizing the rate of additive injected at the first slurry injection point 122, then maximizing the rate of additive injected at the second slurry injection point 124, then maximizing the rate of additive injected at the clean injection point 136. The clean injection point 136 offers little to no erosion reduction benefits in such embodiments, and thus it is primarily used as a remainder rate in such embodiments.

The treatment fluid from the slurry side 110 comprising the base fluid, proppant, and additive is pumped through the slurry frac pump 120. The slurry frac pump 120 pumps the treatment fluid at an operating pressure, for example, between about 1,000 and about 20,000 psi, between about 3,000 and about 17,000 psi, or between about 5,000 and about 15,000 psi. The treatment fluid from the clean side 130 is pumped through the clean frac pump 134. The clean frac pump 134 pumps the treatment fluid at an operating pressure, for example, between about 1,000 and about 20,000 psi, between about 3,000 and about 17,000 psi, or between about 5,000 and about 15,000 psi. The treatment fluids are then combined to form the treatment fluid with the downhole rate of additive, which is delivered to a wellhead 170. The treatment fluids can be combined before or after delivery to the wellhead 170.

The downhole rate of additive in the treatment fluid delivered to the wellhead 170 is suitable to provide a benefit to the treatment fluid in the wellhead 170. Such benefits include friction reduction and promoting laminar flow of the treatment fluid to diminish energy losses during pumping. The downhole rate and benefits provided therefrom are dependent on the application envisioned. The downhole rate is ramped or stepped up to the desired value during pumping. The downhole rate can be, for example, between about 1 and about 20 lb/min, between about 2 and about 15 lb/min, between about 3 and about 12 lb/min, between about 5 and about 10 lb/min, between about 7 and about 9 lb/min or can be about 8 lb/min. In an embodiment where the additive comprises dry polyacrylamide, the downhole rate is preferably about 8 lb/min.

The downhole rate is determined to achieve a predetermined downhole additive concentration. The downhole rate of additive is determined by multiplying the downhole concentration of additive and downhole flowrate of treatment fluid. For example, for a treatment fluid delivered to the wellhead 170 at a downhole flowrate of about 4,000 gpm, if the desired downhole concentration of additive is about 2 lb/1000 gal, then the downhole rate of additive must be about 8 lb/min. Thus in this example, the rates of additive injected throughout the pumping assembly 100 would sum to about 8 lb/min in order to achieve the desired downhole rate and downhole concentration. The downhole flowrate of treatment fluid delivered to the subterranean formation varies widely among applications and can be, for example, between about 1000 and about 10,000 gallons per minute ("gpm"), between about 500 and about 7,000 gpm, or between about 800 and about 5,000 gpm. The desired downhole concentration of additive in the flowing treatment fluid can be, for example, between about 0.1 and about 40 lb/1000 gal, between about 0.3 and about 5 lb/1000 gal, or between about 0.5 and about 3 lb/1000 gal. Where the additive is a fluid viscosifier, the downhole concentration can be about 20 lb/1000 gal. In any embodiment wherein the additive comprises a dry polyacrylamide, the downhole concentration is preferably between about 0.5 and about 3 lb/1000 gal.

The methods can be generalized to a variety of constraints. In any embodiment, the various rates of additive injected into the pumping assembly 100 sum to the downhole rate. The methods can be generalized such that each of the first slurry injection point 122, second slurry injection point 124, and clean injection point 136 can be located in other locations as discussed above, or in other locations not shown in FIG. 1. The methods can be further generalized to reservoir enhancing applications. The slurry side 110 can comprise one or more slurry injection points without limit, wherein each slurry injection point has one or more constraints incentivizing or restricting the rate of additive injected at that point. For example, polyacrylamide is injected at a first slurry side rate into the first slurry injection point 122 to reduce erosion in the pumping assembly 100 and maintain a minimum operating pressure of the discharge pump 118. The first slurry side rate is maximized for its optimal erosion reduction benefits, but is restricted to a maximum value to prevent aeration of the base fluid in the slurry mixer 116. More broadly, however, an additive can be injected into the slurry side 110 at a first slurry side rate to prevent any number of detrimental effects, for example degradation of the discharge pump 118 or other pumping equipment. Additionally, such degradation or other detrimental effects can be caused by any number of detrimental causes, for example aeration of the base fluid. Positive benefits of the additive, such as proppant transport, friction reduction, and lubrication can be determined. Similarly, negative constraints such as proppant setting, erosion, corrosion, and aeration can be determined. The additive can be proportionally injected throughout the pumping assembly 100 such that positive effects are maximized, negative effects are minimized, and the rate of the additive injected throughout the pumping assembly 100 sums to the downhole rate. Similarly, additional slurry injection points and clean injection points can be contemplated to maximize certain benefits while minimizing certain detrimental effects, which vary based on the application envisioned, the base fluid, proppant, and additive used, and any other potentially relevant considerations including operating conditions.

Although not shown in FIG. 1, it is to be understood that the methods described herein can be carried out using a computer-operated control system. Such a control system includes temperature sensors, pressure sensors, flowmeters, and other devices configured to measure or affect a variable output. For example, the suction pump 112 can include a flowmeter configured to measure the flowrate of base fluid through the suction pump 112 and convey that measured flowrate to a controlling computer. The controlling computer can be configured to inject the additive at variable times, locations, and rates. The controlling computer can be configured to receive and react to feedback from the system. For example, the controlling computer can adjust the rate of additive injected at the first slurry injection point 122 based on the operating pressure of the discharge pump 118.

Figure 2:
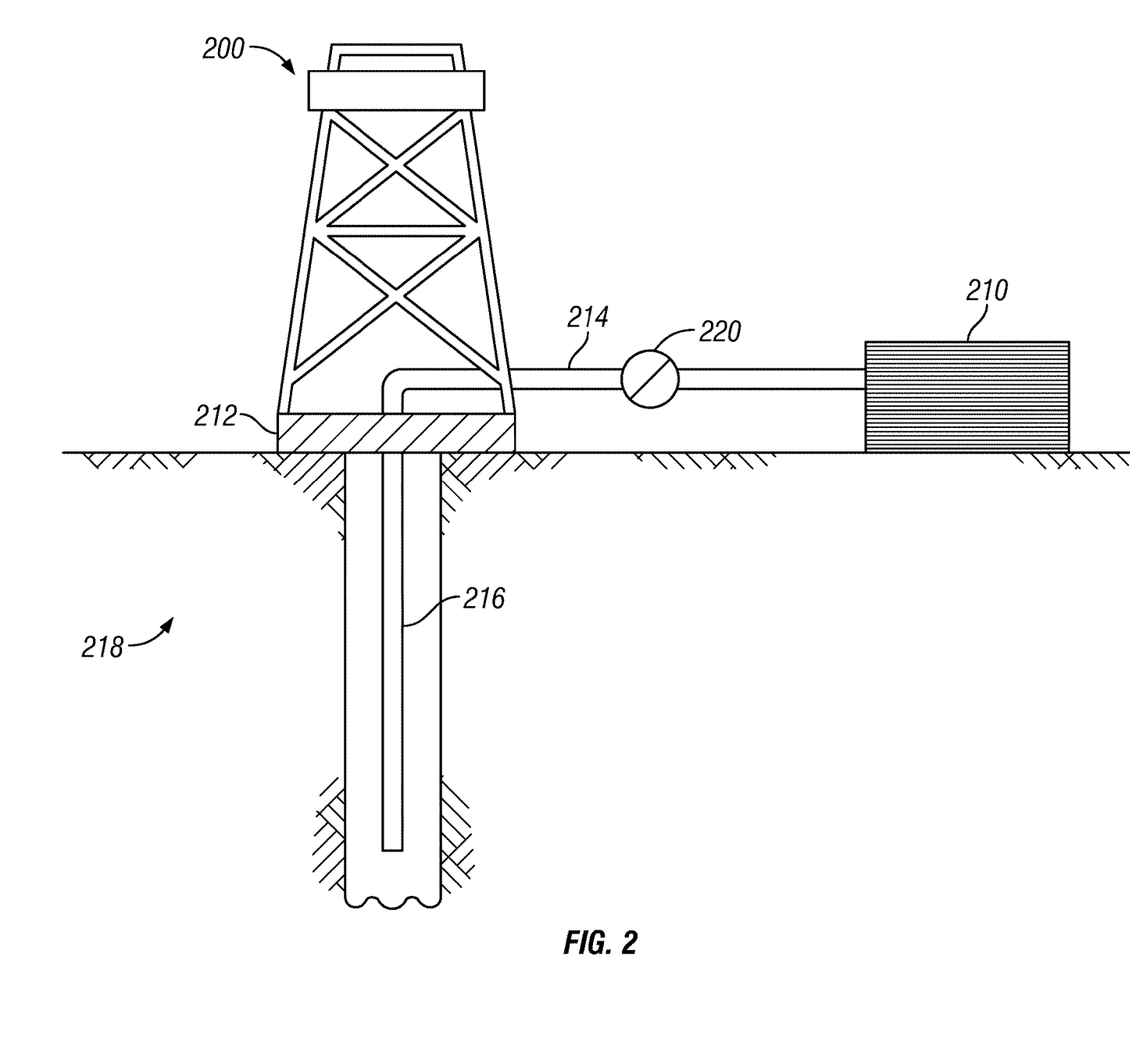
FIG. 2 is a diagram of a system for delivering the treatment fluid into the subterranean formation, according to one or more embodiments.

FIG. 2 shows an illustrative schematic of systems and apparatuses that can deliver the treatment fluid of the present invention to a subterranean location. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 200 can include mixing tank 210, in which the base fluid of the clean side and the base fluid of the slurry side can be combined to form the treatment fluid. Alternatively, the base fluids of the clean side and slurry side can be combined at another location upstream of the wellhead 212, or at the wellhead 212. The location of combining the base fluids to form the treatment fluid is influenced by plumbing geometry of line 214 and turbulence of fluids flowing through line 214. Therefore, the combining location can vary based on the envisioned application. The treatment fluid or base fluids can be conveyed via line 214 to wellhead 212, where the treatment fluid or base fluids enter tubular 216, with tubular 216 extending from wellhead 212 into subterranean formation 218. Upon being ejected from tubular 216, the treatment fluid can subsequently penetrate into subterranean formation 218. Pump 220 can be configured to raise the pressure of the treatment fluid or base fluids to a desired degree before introduction into tubular 216. It is to be recognized that system or apparatus 200 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Figure 3:
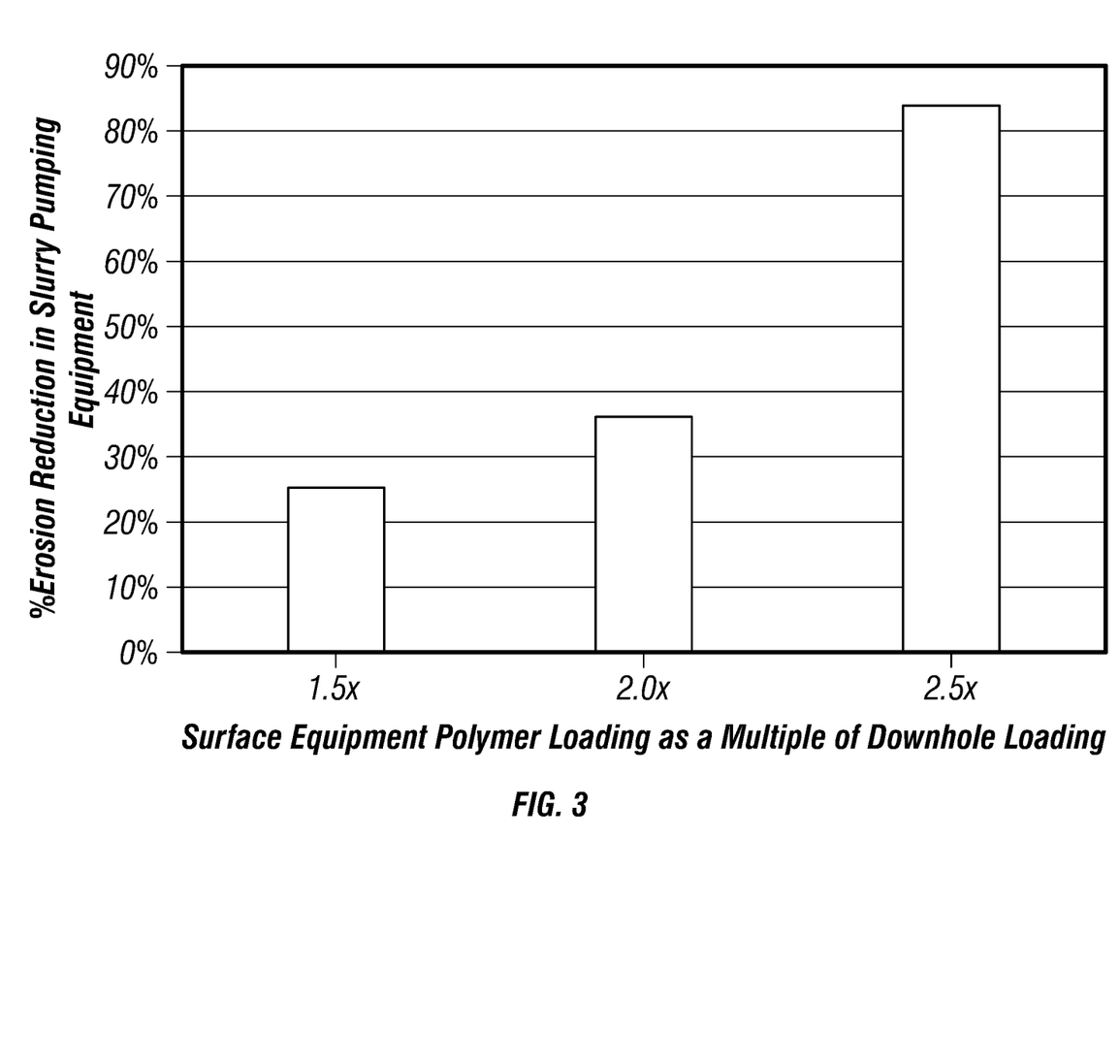
FIG. 3 is a graph showing percent erosion reduction varies nonlinearly with loading.

FIG. 3 shows test data indicating the potential benefit of erosion reduction for the systems and methods described herein. The proppant traveling through the pumping assembly causes erosion, particularly in the slurry side and in the pumps therein. The additive described herein can reduce erosion in the slurry side, particularly in the discharge pump. As shown in FIG. 3, erosion reduction benefits vary significantly and nonlinearly with polymer loading in the surface equipment of the systems described herein. Percent erosion reduction was determined by comparing the amount of surface piping that passed recertification testing at various downhole loadings to a conventional surface piping recertification pass rate.

As shown in FIG. 3, where the surface equipment polymer loading is about two times that of the downhole loading, the slurry pumping equipment yields about a 35% erosion reduction. At 2.5× loading, the erosion reduction is above 80%. Increasing additive rates across all the surface equipment would reduce erosive wear, but would result in additive rates in the treatment fluid in excess of the desired downhole rate, increasing material costs disproportionately. Annual maintenance costs related to erosion failure for slurry pumping equipment exceeds tens of millions of dollars. Optimization of proportioning of the additive throughout the slurry side of the systems described herein as described in the methods herein could reduce such expenditures by millions or tens of millions of dollars while minimizing material costs.

Hydraulic Fracturing and Proppant

The treatment fluid of the present invention is particularly useful in applications related to hydraulic fracturing, also referred to as fracturing or fracking. Hydraulic fracturing is a common stimulation treatment performed to increase production of a subterranean formation. A treatment fluid for this purpose is sometimes referred to as a fracturing fluid that includes a base fluid and proppant.

Viscosity-Increasing Agents

The proppant typically has a higher density than water. For example, sand has a specific gravity of about 2. Any proppant suspended in water will tend to separate quickly and settle out from the water very rapidly. To help suspend the proppant (or other particulate with a substantially different density than water) in a water-based fracturing fluid, it is common to use an additive such as a viscosity-increasing agent for increasing the viscosity of water.

The additive can include a viscosity-increasing agent to increase the viscosity of the base fluid or treatment fluid, which is desirable for a fluid comprising water. A "viscosity-increasing agent" as used herein is a chemical additive that alters fluid rheological properties to increase the viscosity of the fluid.

Friction-Reducing Agents

A fracturing treatment can involve pumping a proppant-free or proppant-containing base fluid or treatment fluid into a subterranean formation. During the pumping of the fracturing fluid into the wellbore, a considerable amount of energy may be lost due to friction between the base fluid or treatment fluid in turbulent flow and the formation and/or tubular goods (e.g., pipes, coiled tubing, etc.) disposed within the wellbore. Because of these energy losses, additional horsepower may be necessary to achieve the desired treatment.

To reduce these energy losses, an additive may be injected into the base fluid. In certain embodiments, the additive is a friction-reducing agent (alternatively referred to herein as a friction reducer). A friction-reducing agent is a chemical additive that alters fluid rheological properties to reduce friction created within the fluid as it flows through small-diameter tubulars or similar restrictions. Generally, polymers or similar friction-reducing agents add viscosity to the fluid, which reduces the turbulence induced as the fluid flows. The friction-reducing agent reduces the frictional losses due to friction between the treatment fluid in turbulent flow and the tubular goods and/or the subterranean formation. A friction reducer can also help reduce the apparent viscosity and improve the rheological properties of a slurry. As a result, turbulent flow can be achieved at lower pumping rates, which results in reduced friction pressure during pumping. When the apparent viscosity of a slurry is reduced, the slurry can be mixed at a higher density by reductions in the amount of liquid added. In an embodiment, the friction-reducing agent comprises a solid friction-reducing agent entrained in a liquid hydrocarbon slurry.

Viscosity-increasing agents and friction-reducing agents often comprise hydratable polymers. Similarly, the friction-reducing agents are typically hydrated directly in the water to be used in the well treatment fluid. In some cases, a viscosity-increasing agent and a friction-reducing agent may be the same hydratable polymer, merely used in a lower rate for reducing fluid friction.

Although any friction-reducing agent may be used in the described methods, examples of water-soluble friction-reducing agents include guar gum, guar gum derivatives, polyacrylamide, and polyethylene oxide. In an embodiment, the friction-reducing agent comprises dry polyacrylamide. In this embodiment, the friction-reducing agent can be referred to as a solid friction-reducing agent. In another embodiment, the friction-reducing agent comprises solid polyacrylamide entrained in a liquid hydrocarbon slurry. In this embodiment, the friction-reducing agent can be referred to as a liquid friction-reducing agent. Liquid friction-reducing agents provide effective friction reduction and reduce erosion to surface equipment. However, the liquid hydrocarbon slurry is comparatively expensive and cannot be efficiently utilized for purposes beyond carrying the entrained friction-reducing agent. Dry polyacrylamide can be advantageously used as a solid friction-reducing agent with cheaper material costs than liquid friction-reducing agents. However, base fluids containing a proppant frequently encounter aeration issues at high rates of solid friction-reducing agents. Aeration and other issues caused by excessive additive rates in the base fluid can deteriorate pump performance leading to decreased operating pump pressure and increased wear on pumps. The rate of additive in the base fluid is restricted to a maximum value to maintain a minimum operating pressure of the discharge pump. Particularly, the rate of additive in the base fluid is restricted to a maximum value to prevent aeration of the base fluid by air entrained in the proppant in order to maintain a minimum operating pressure of the discharge pump.

Elasticity-Increasing Agents

Elasticity pertains to a material that can undergo stress, deform, and then recover and return to its original shape after the stress ceases. Once stress exceeds the yield stress or elastic limit of a material, permanent deformation occurs and the material will not return to its original shape once the stress is removed.

It is sometimes desirable to include a water-soluble elasticity-increasing agent in a fracturing fluid. The additive in the base fluid can include such an elasticity-increasing agent. Again, like viscosity-increasing agents, some elasticity-increasing agents are sensitive to certain ions that may be present in a type or source of water that would otherwise be most convenient to use in a treatment fluid.

Erosion Reduction

Particle erosion occurs when fluid-entrained particles impinge on surfaces, such as when passing through an orifice, impinging on a metering surface, or making a sharp angle turn in a tubing. Places that can be of particular concern for erosion include, for example, pumps, fluid conveying tubing, surface lines, chokes, manifolds, work strings, valves, and various downhole assemblies. All else being equal, such as the type of particles, the shape and size of the particles, and the rate of the particles, a fluid containing a particulate that is moving at a lower velocity adjacent a particular surface is believed to cause less erosion to the surface than a fluid moving at higher velocity.

When pumping a fluid containing a particulate, such as the base fluid or treatment fluid containing the proppant, the sand or other type of particulate material is usually very abrasive when pumped in a fluid moving at high pumping rates. This leads to erosive wear on the pumping equipment during use. The abrasiveness of the proppant can cause erosion on metal surfaces inside pumps, connective piping, and downhole tubulars and equipment. The erosion is especially problematic within the pumps, where the local fluid velocities adjacent to valves and other surfaces can be much higher than the average velocity of the fluid being pumped through a cylinder of the fluid end. The erosion of these surfaces causes wear on the pumps and can result in high maintenance costs. Frac pumps in particular suffer from high maintenance and replacement costs due to erosive wear.

The methods and system of the present invention described herein advantageously reduce equipment wear, particularly pump wear, encountered when pumping proppant-containing fluids. As described above with respect to FIGS. 1 and 3, the rates of additive injected into the slurry side and clean side are determined in such a way as to maximize erosion reduction benefits of the pumping assembly.

Treatment Fluid and Base Fluid

As used herein, a "treatment fluid" is a fluid designed and prepared to resolve a specific condition in a wellbore, reservoir, or subterranean formation. The treatment fluid may be for any of a wide variety of downhole purposes in a well or subterranean formation, such as stimulation, isolation, or control of reservoir gas or water. "Stimulation" is a treatment for the purpose of enhancing or stimulating oil or gas production. "Isolation" is a treatment for isolating one region or portion of a wellbore or subterranean formation from another. "Control" is a treatment for the purpose of controlling or limiting excess water production or sand production from the well. Treatment fluids are typically prepared adjacent to the wellhead at the well site. The term "treatment" in the term "treatment fluid" does not necessarily imply any particular action by the fluid. As used herein, a fluid may or may not be a slurry, which is a suspension of insoluble particles (such as sand, clay, etc.) in a fluid. As used herein a "fluid" is a continuous amorphous substance that tends to flow and to conform to the outline of its container as a liquid or a gas, when tested at a temperature at room temperature of 68° F. (20° C.) and standard pressure (1 atm).

The treatment fluid of the present invention includes, but is not limited to, a base fluid. The base fluid can be a water-based fluid. As used herein, "water-based" means that the fluid comprises greater than 50% by weight an aqueous solution. In general, as used herein, an "aqueous solution" refers to a water used or received to be used in any of the methods according to the invention. The water is referred to as an "aqueous solution" because it would be expected to normally include substantial or insubstantial rates of dissolved solids, such as sodium chloride, calcium chloride, magnesium chloride, sodium sulfate, and other water-soluble salts (up to the saturation limit of each). The term "aqueous solution" may include small amounts of other materials, however, the term excludes anything that is included in or added to the aqueous solution for the purposes of a well treatment in which the aqueous solution is to be used. For example and preferably, an "aqueous solution" may be up to 1% by weight of total water-miscible or water-soluble organic materials; up to 2% by weight of total dispersed, oil, grease, and water-insoluble production chemicals; up to 10% by weight of total dispersed oil, grease, and non-surfactant water-insoluble production chemicals with surfactant production chemicals; and up to 1% by weight of total suspended silt or smaller particles (avoiding any layer of oil or other insoluble materials floating on the surface or any sludge settled on the bottom of the water as received). For example, the oil, grease, and production chemicals would be typically found, for example, in produced water. A water-based fluid (comprising an aqueous solution) may or may not include other suspended components, such as oil, clay, proppant, and other additives, which can be added to or mixed with the aqueous solution for the purposes of forming a base fluid or treatment fluid.

A water-based fluid can be an emulsion, foamed with a gas, or both. For example, such suspended components can be selected from the group consisting of: a clay, a water-insoluble organic material, a gas, and any combination thereof in any proportion. Further, a water-based fluid may include other water-soluble or water-miscible additives.

An example of a water-based treatment fluid is a fracturing fluid. Another example of a water-based treatment fluid is a drilling mud, which includes an aqueous solution and undissolved solids (as solid suspensions, mixtures, and emulsions). A water-based drilling mud can be based on a brine. Both the dissolved solids and the undissolved solids can be chosen to help increase the density of the fluid. A commonly-used example of an undissolved weighting agent is bentonite clay. The density of a drilling mud can be much higher than that of typical seawater or even higher than high-density brines due to the presence of suspended solids.

Adding Crosslinker, Breaker, Surfactant, Proppant, and Other Additives

One or more additives are injected into the base fluid for various purposes, for example, to stimulate the subterranean formation. In addition to the aforementioned viscosity-increasing agents, friction-reducing agents, and elasticity-increasing agents, the additive can include a crosslinking agent. The viscosity of solutions of guar gum and other viscosity-increasing agents (sometimes referred to as "thickeners") can be greatly enhanced by crosslinking them. One example of a crosslinking agent is boric acid. During this time, the incompletely hydrated polymer can continue to develop toward a fully crosslinked viscosity, despite that it may have been crosslinked at less-than-full hydration. In various embodiments, the boron crosslinking agent is also provided in the polymer stream as a mixture of dry ingredients or as part of the petroleum oil emulsion.

Fluids used in the invention also may include a breaker, although not commonly used in water-frac treatments. A breaker is a chemical used for the purpose of diminishing or "breaking" the viscosity of the fluid so that this fluid can be recovered more easily from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH, and, therefore, increasing the effective rate of the active crosslinker, the borate anion, reversibly creates the borate crosslinks. Lowering the pH can eliminate the borate/polymer bonds. At a high pH above 8, the borate ion exists and is available to crosslink and cause gelling. At a lower pH, the borate is tied up by hydrogen and is not available for crosslinking, thus, increases in viscosity due to crosslinking by borate ion is reversible.

Some fluids used in the invention may also include a surfactant. For example, a surfactant may be used for its ability to aid the dispersion and/or stabilization of a gas component into the fluid. Viscoelastic surfactants are also suitable for use in the treatment fluids.

A fiber component may be included in the fluids used in the inventions to achieve a variety of properties including improving particle suspension, particle transport capabilities, and gas phase stability. Fibers used may be hydrophilic or hydrophobic in nature, but hydrophilic fibers are preferred. Fibers can be any fibrous material. The fiber component may be included at rates from about 1 to about 15 grams per liter of the liquid phase of the fluid, preferably the rate of fibers are from about 2 to about 12 grams per liter of liquid, and more preferably from about 2 to about 10 grams per liter of liquid Fluids used in the invention may further contain other additives and chemicals that are known to be commonly used in oil field applications by those skilled in the art. These include, but are not necessarily limited to, breaker aids, co-surfactants, oxygen scavengers, alcohols, scale inhibitors, corrosion inhibitors, fluid-loss additives, oxidizers, bactericides, biocides, and the like.

Examples of the Above Embodiments Include:

Example 1 is a method of delivering a treatment fluid comprising a base fluid, a proppant, and an additive into a subterranean formation using a pumping assembly comprising a clean side and a slurry side, the method comprising: determining a downhole rate of the additive in the treatment fluid to achieve a predetermined downhole additive concentration; injecting the additive into the slurry side at a first slurry side location in or upstream of a slurry mixer at a first slurry side rate; injecting the additive into at least one of the slurry side at a second slurry side location downstream of the slurry mixer and upstream of a discharge pump at a second slurry side rate or the clean side at a clean side rate; combining the additive from the first slurry side location with any additive from the second slurry side location and the clean side to form the treatment fluid with the downhole rate of the additive; and delivering the treatment fluid into the subterranean formation; wherein the first slurry side rate is suitable to maintain a minimum operating pressure of a discharge pump in the slurry side and the second slurry side rate is suitable to prevent exceeding a proppant transport capability of the base fluid.

In Example 2, the embodiments of any preceding paragraph or combination thereof further include the method of example 1, wherein at least one of the first slurry side rate or second slurry side rate is suitable to reduce erosion in the slurry side by at least 35%.

In Example 3, the embodiments of any preceding paragraph or combination thereof further include the method of example 1, wherein the downhole rate is suitable to reduce friction and promote laminar flow of the treatment fluid in the subterranean formation.

In Example 4, the embodiments of any preceding paragraph or combination thereof further include the method of example 1, wherein the additive comprises a friction-reducing agent.

In Example 5, the embodiments of any preceding paragraph or combination thereof further include the method of example 4, wherein the friction-reducing agent comprises dry polyacrylamide.

In Example 6, the embodiments of any preceding paragraph or combination thereof further include the method of example 4, wherein the friction-reducing agent comprises solid polyacrylamide entrained in a liquid hydrocarbon slurry.

In Example 7, the embodiments of any preceding paragraph or combination thereof further include the method of example 1, comprising injecting the additive into the slurry side at the second slurry side location downstream of the slurry mixer and upstream of the discharge pump at the second slurry side rate.

In Example 8, the embodiments of any preceding paragraph or combination thereof further include the method of example 1, comprising injecting the additive into the clean side.

In Example 9, the embodiments of any preceding paragraph or combination thereof further include the method of example 1, comprising: injecting the additive into the slurry side at the second slurry side location at the second slurry side rate; and injecting the additive into the clean side at a clean side rate amounting to the difference between the downhole rate and a total of the first slurry side rate and the second slurry side rate.

In Example 10, the embodiments of any preceding paragraph or combination thereof further include the method of example 1, wherein the first slurry side rate is suitable to prevent aeration of the base fluid by air entrained in the proppant in order to maintain a minimum operating pressure of the discharge pump downstream of the slurry mixer.

In Example 11, the embodiments of any preceding paragraph or combination thereof further include the method of example 1, wherein the rate of the additive injected at the second slurry side location is suitable to maintain a minimum flowrate of the base fluid through a suction pump upstream of the slurry mixer in order to prevent exceeding a proppant transport capability of the base fluid in the slurry mixer.

Example 12 is a method of delivering a treatment fluid comprising a base fluid, a proppant, and a polyacrylamide into a subterranean formation using a pumping assembly comprising a clean side and a slurry side, the method comprising: determining a downhole rate of the polyacrylamide in the treatment fluid; injecting the polyacrylamide into the treatment fluid in slurry side at a first slurry side location in or upstream of a slurry mixer at a first slurry side rate; injecting the polyacrylamide into the treatment fluid in the slurry side at a second slurry side location downstream of the slurry mixer and upstream of a discharge pump at a second slurry side rate; injecting the polyacrylamide into the treatment fluid in the clean side at a clean side rate amounting to the difference between the downhole rate and a total of the first slurry side rate and the second slurry side rate; combining the treatment fluid from the slurry side with the treatment fluid from the clean side to form the treatment fluid with the downhole rate of the polyacrylamide; and delivering the treatment fluid into the subterranean formation; wherein the first slurry side rate is suitable to maintain a minimum operating pressure of a discharge pump downstream of the first slurry side location; wherein the second slurry side rate is suitable to prevent exceeding a proppant transport capability of the base fluid; wherein the downhole rate is suitable to reduce friction and promote laminar flow of the treatment fluid in the subterranean formation; and wherein at least one of the first slurry side rate or second slurry side rate is suitable to reduce erosion in the slurry side by at least 35%.

In Example 13, the embodiments of any preceding paragraph or combination thereof further include the method of example 12, wherein the first slurry side rate is suitable to prevent aeration of the base fluid by air entrained in the proppant in order to maintain a minimum operating pressure of a discharge pump downstream of the first slurry side location.

In Example 14, the embodiments of any preceding paragraph or combination thereof further include the method of example 12, wherein the second slurry side rate is suitable to maintain a minimum flowrate of the base fluid through a suction pump upstream of the second slurry side location to prevent exceeding a proppant transport capability of the base fluid.

Example 15 is a system for delivering a treatment fluid including a base fluid, a proppant, and an additive at a downhole rate into a subterranean formation, comprising: a pumping assembly comprising a clean side and a slurry side configured to pump the treatment fluid; wherein the slurry side comprises a slurry mixer, a discharge pump, a first slurry injection point configured for injecting the additive into the base fluid at or upstream of the slurry mixer, and a second slurry injection point downstream of the slurry mixer and upstream of the discharge pump; and wherein the clean side comprises a clean side injection point; wherein a discharge pump minimum operating pressure is maintainable with the additive injected at the first slurry injection point at a first slurry rate and a proppant transport capability of the base fluid in the slurry side is not exceeded with any additive injected at the second slurry injection point at a second slurry rate; and wherein the base fluid, proppant, and additive in the slurry side is combinable with the base fluid and any additive injected in the clean side injection point at a clean side rate for formation of the treatment fluid with the downhole rate of the additive and delivery into the subterranean formation.

In Example 16, the embodiments of any preceding paragraph or combination thereof further include the system of example 15, wherein the slurry mixer is configured to receive and mix the base fluid, the proppant, and the additive; and the discharge pump is configured to pump the base fluid out of the slurry mixer.

In Example 17, the embodiments of any preceding paragraph or combination thereof further include the system of example 16, wherein the slurry side further comprises: a suction pump configured to pump the base fluid into the slurry mixer; proppant screws configured to deliver the proppant into the slurry mixer; and a slurry frac pump configured to receive the base fluid, proppant, and additive in the slurry side from the discharge pump and to pump the base fluid, proppant, and additive in the slurry side for combining with the base fluid and any additive injected in the clean side injection point.

In Example 18, the embodiments of any preceding paragraph or combination thereof further include the system of example 17, wherein the first slurry side rate is suitable to prevent aeration of the base fluid by air entrained in the proppant in order to maintain a minimum operating pressure of the discharge pump.

In Example 19, the embodiments of any preceding paragraph or combination thereof further include the system of example 17, wherein the suction pump is operable to maintain a minimum flowrate of the base fluid through the suction pump in order to prevent exceeding the proppant transport capability of the base fluid in the slurry mixer.

In Example 20, the embodiments of any preceding paragraph or combination thereof further include the system of example 17, wherein the clean side further comprises: a clean boost configured to pump the base fluid and additive to a clean frac pump; and the clean frac pump configured to receive the base fluid and additive from the clean boost and to pump the base fluid and any additive injected in the clean side injection point for combining with the base fluid, proppant, and additive in the slurry side.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of delivering a treatment fluid comprising a base fluid, a proppant, and an additive into a subterranean formation using a pumping assembly comprising a clean side and a slurry side, the method comprising:
   determining a downhole rate of the additive in the treatment fluid to achieve a predetermined downhole additive concentration;
   injecting the base fluid into both the slurry side and the clean side;
   delivering the proppant into a slurry mixer on the slurry side;
   injecting the additive into the slurry side at a first slurry side location in or upstream of the slurry mixer at a first slurry side rate selected to maintain a minimum operating pressure of a discharge pump in the slurry side downstream of the slurry mixer;
   injecting the additive into at least one of the slurry side at a second slurry side location downstream of the slurry mixer and upstream of the discharge pump at a second slurry side rate selected to prevent exceeding a proppant transport capability of the base fluid and the additive in the slurry side or the clean side at a clean side rate;
   combining the additive from the first slurry side location with any additive from the second slurry side location and the clean side to form the treatment fluid with the downhole rate of the additive; and
   delivering the treatment fluid into the subterranean formation.

2. The method of claim 1, wherein the combined selected first slurry side rate and the selected second slurry side rate is amount to an additive rate in the slurry side that is a multiple of the downhole rate large enough to reduce erosion in the slurry side by at least 35% compared with not selecting the first slurry side rate to maintain the minimum operating pressure or the second slurry side rate to prevent exceeding the proppant transport capability.

3. The method of claim 1, wherein determining the downhole rate further comprises determining a rate to reduce friction and promote laminar flow of the treatment fluid in the subterranean formation.

4. The method of claim 1, wherein the additive comprises a friction-reducing agent.

5. The method of claim 4, wherein the friction-reducing agent comprises dry polyacrylamide.

6. The method of claim 4, wherein the friction-reducing agent comprises solid polyacrylamide entrained in a liquid hydrocarbon slurry.

7. The method of claim 1, comprising injecting the additive into the slurry side at the second slurry side location downstream of the slurry mixer and upstream of the discharge pump at the second slurry side rate.

8. The method of claim 1, comprising injecting the additive into the clean side at the clean side rate.

9. The method of claim 1, comprising:
injecting the additive into the slurry side at the second slurry side location at the second slurry side rate; and
injecting the additive into the clean side at a clean side rate amounting to the difference between the downhole rate and a total of the first slurry side rate and the second slurry side rate.

10. The method of claim 1, wherein the first slurry side rate is selected to prevent aeration of the base fluid by air entrained in the proppant in order to maintain the minimum operating pressure.

11. The method of claim 1, wherein the second slurry side rate is further selected to maintain a minimum flowrate of the base fluid upstream of the slurry mixer in order to prevent exceeding a proppant transport capability of the base fluid in the slurry mixer.

12. A method of delivering a treatment fluid comprising a base fluid, a proppant, and a polyacrylamide into a subterranean formation using a pumping assembly comprising a clean side and a slurry side, the method comprising:
determining a downhole rate of the polyacrylamide in the treatment fluid to reduce friction and promote laminar flow of the treatment fluid in the subterranean formation;
injecting the base fluid into both the slurry side and the clean side;
delivering the proppant into a slurry mixer on the slurry side;
injecting the polyacrylamide into the treatment fluid in die slurry side at a first slurry side location in or upstream of the slurry mixer at a first slurry side rate selected to maintain a minimum operating pressure of a discharge pump downstream of the first slurry side location;
injecting the polyacrylamide into the treatment fluid in the slurry side at a second slurry side location downstream of the slurry mixer and upstream of a discharge pump at a second slurry side rate selected to prevent exceeding a proppant transport capability of die base fluid and the additive in the slurry side;
injecting the polyacrylamide into the treatment fluid in the clean side at a clean side rate amounting to the difference between the downhole rate and a total of the first slurry side rate and the second slurry side rate;
combining the treatment fluid from the slurry side with the treatment fluid from the clean side to form the treatment fluid with the downhole rate of the polyacrylamide; and
delivering the treatment fluid into the subterranean formation.

13. The method of claim 12, wherein the first slurry side rate being selected to maintain the minimum operating pressure further comprises the first slurry side rate being selected to prevent aeration of the base fluid by air entrained in the proppant.

14. The method of claim 12, wherein the second slurry side rate is further selected to maintain a minimum flowrate of the base fluid upstream of the second slurry side location.

15. The method of claim 12, wherein the combined selected first slurry side rate and the selected second slurry side rate amount to an additive rate in the slurry side that is a multiple of the downhole rate large enough to reduce erosion in the slurry side by at least 35% compared with not selecting the first slurry side rate to maintain the minimum operating pressure or the second slurry side rate to prevent exceeding the proppant transport capability.

16. A system for delivering a treatment fluid including a base fluid, a proppant, and an additive at a downhole rate into a subterranean formation, comprising:
a pumping assembly comprising a clean side and a slurry side configured to pump the treatment fluid;
wherein the slurry side comprises a slurry mixer, a discharge pump, a first slurry injection point configured for injecting the additive into the base fluid at or upstream of the slurry mixer, and a second slurry injection point downstream of the slurry mixer and upstream of the discharge pump;
wherein the clean side comprises a clean side injection point configured for injecting the additive into the clean side;
wherein a minimum operating pressure of the discharge pump is maintainable with the additive injected at the first slurry injection point at a first slurry rate selected to maintain the minimum operating pressure;
wherein a proppant transport capability of the fluid in the slurry side is not exceeded with any additive injected at the second slurry injection point at a second slurry rate selected not to exceed the proppant transport capability; and
wherein the base fluid, proppant, and additive in the slurry side are combinable with the base fluid in the clean side and any additive injected in the clean side injection point at a clean side rate to form the treatment fluid with the downhole rate of the additive for delivery into the subterranean formation.

17. The system of claim 16, wherein:
the slurry mixer is configured to receive and operable to mix the base fluid, the proppant, and the additive; and
the discharge pump is operable to pump the base fluid, the proppant, and the additive out of the slurry mixer.

18. The system of claim 17, wherein the slurry side further comprises:
a suction pump operable to pump the base fluid into the slurry mixer;
proppant screws operable to deliver the proppant into the slurry mixer; and
a slurry frac pump configured to receive the base fluid, proppant, and additive in the slurry side from the discharge pump and operable to pump the base fluid, proppant, and additive in the slurry side for combining with the base fluid and any additive injected in the clean side injection point.

19. The system of claim 18, wherein the first slurry rate is selected to prevent aeration of the base fluid by air entrained in the proppant to maintain the minimum operating pressure.

20. The system of claim 18, wherein the suction pump is operable to maintain a minimum flowrate of the base fluid through the suction pump in order to prevent exceeding the proppant transport capability of the base fluid in the slurry mixer.

21. The system of claim 18, wherein the clean side further comprises:
   a clean boost configured to pump the base fluid and additive to a clean frac pump; and
   the clean frac pump configured to receive the base fluid and additive from the clean boost and to pump the base fluid and any additive injected in the clean side injection point for combining with the base fluid, proppant, and additive in the slurry side.

* * * * *

UNITED STATES PATENT AND TRADEMARK OFFICE
CERTIFICATE OF CORRECTION

PATENT NO. : 11,352,552 B1
APPLICATION NO. : 17/171518
DATED : June 7, 2022
INVENTOR(S) : Chad Adam Fisher It is certified that error appears in the above-identified patent and that said Letters Patent is hereby corrected as shown below:

In the Claims

Claim 12, Column 17, Line 45: "injecting the polyacrylamide into the treatment fluid in die" should read "injecting the polyacrylamide into the treatment fluid in the".

Claim 12, Column 17, Line 54: "ing a proppant transport capability of die base fluid and" should read "ing a proppant transport capability of the base fluid and".

Signed and Sealed this
Second Day of August, 2022

*Katherine Kelly Vidal*

Katherine Kelly Vidal
*Director of the United States Patent and Trademark Office*